United States Patent
Senarath et al.

(10) Patent No.: US 10,334,535 B2
(45) Date of Patent: *Jun. 25, 2019

(54) SYSTEM AND METHOD FOR POWER CONTROL

(71) Applicant: Huawei Technologies Co., Ltd., Shenzhen (CN)

(72) Inventors: Nimal Gamini Senarath, Ottawa (CA); Israfil Bahceci, Nepean (CA); Peiying Zhu, Kanata (CA); Aaron James Callard, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

This patent is subject to a terminal disclaimer.

(21) Appl. No.: 14/679,816

(22) Filed: Apr. 6, 2015

(65) Prior Publication Data

US 2015/0282096 A1    Oct. 1, 2015

Related U.S. Application Data

(63) Continuation of application No. 12/633,657, filed on Dec. 8, 2009, now Pat. No. 9,031,599.

(51) Int. Cl.
    H04L 1/00    (2006.01)
    H04W 52/24   (2009.01)
    (Continued)

(52) U.S. Cl.
    CPC .......... *H04W 52/24* (2013.01); *H04L 1/0026* (2013.01); *H04W 52/146* (2013.01);
    (Continued)

(58) Field of Classification Search
    CPC ..... H04W 52/02; H04W 52/04; H04W 52/24; H04W 52/34; H04W 52/50; H04W 52/52;
    (Continued)

(56) References Cited

U.S. PATENT DOCUMENTS

| | | |
|---|---|---|
| 6,351,461 B1 | 2/2002 | Sakoda et al. |
| 6,788,687 B2 | 9/2004 | Bao et al. |

(Continued)

FOREIGN PATENT DOCUMENTS

| | | |
|---|---|---|
| CN | 1344445 | 4/2002 |
| CN | 1545217 | 11/2004 |

(Continued)

OTHER PUBLICATIONS

"3rd Generation Partnership Project; LTE; Evolved Universal Terrestrial Radio Access (E-UTRA); Physical layer procedures," Technical Specification 136.213, Feb. 2009, pp. 1-75, vol. 8.5.0.

(Continued)

*Primary Examiner* — Yuwen Pan
*Assistant Examiner* — Paul P Tran
(74) *Attorney, Agent, or Firm* — Slater Matsil, LLP

(57) ABSTRACT

A user equipment (UE) may compute uplink power control levels as a function of a downlink signal to noise ratio (SNIR). For example, the UE may determine an uplink transmit power level by summing a full power control (FPC) transmit power level, a product of a first adjustment factor ($\beta$) and the downlink SNIR, and a negative of a second adjustment factor ($\Delta 2$) when the product of the first adjustment factor ($\beta$) and the downlink SNIR is greater than or equal to the second adjustment factor ($\Delta 2$). A UE may also compute an uplink power control level as a function of target and/or current interference levels associated with neighboring base stations. A UE may also iteratively reduce a transmit power level until an interference level experienced by a neighboring base station has fallen below a threshold.

17 Claims, 9 Drawing Sheets

(51) Int. Cl.

| | | |
|---|---|---|
| *H04W 88/02* | (2009.01) | |
| *H04W 88/08* | (2009.01) | |
| *H04W 52/14* | (2009.01) | |
| *H04W 74/00* | (2009.01) | |
| *H04W 52/36* | (2009.01) | |

(52) U.S. Cl.
CPC ....... *H04W 52/241* (2013.01); *H04W 52/242* (2013.01); *H04W 52/244* (2013.01); *H04W 52/245* (2013.01); *H04W 52/247* (2013.01); *H04W 52/248* (2013.01); *H04W 74/002* (2013.01); *H04W 52/36* (2013.01); *H04W 88/02* (2013.01); *H04W 88/08* (2013.01)

(58) Field of Classification Search
CPC ............. H04W 52/146; H04W 52/216; H04W 52/241; H04W 52/242; H04W 52/244; H04W 52/245; H04W 52/247; H04W 52/248; H04W 52/262; H04W 52/286; H04W 52/36; H04W 12/06; H04W 12/12; H04W 80/04; H04W 88/02; H04W 88/06; H04W 88/08; H04W 52/343; H04W 52/365; H04W 52/367; H04W 52/06; H04W 52/08; H04W 52/10; H04W 52/143; H04W 52/18; H04W 52/221; H04W 52/225; H04W 52/228; H04W 52/243; H04W 52/246; H04W 52/265; H04W 52/267; H04W 52/322; H04W 52/325; H04W 52/346; H04W 52/40; H04W 52/42; H04W 52/44; H04W 52/48; H04W 52/54; H04W 72/044; H04W 72/0046; H04W 72/0473; H04W 72/1231; H04W 72/1263; H04W 72/1268; H04W 72/1289; H04W 72/14; H04W 76/28; H04L 1/0002; H04L 1/0026; H04L 1/1822; H04L 27/2601; H04L 27/2647; H04L 1/0003; H04L 1/1812; H04L 43/50; H04L 1/0001; H04L 1/0009; H04L 1/0015; H04L 1/18; H04L 5/023; H04N 7/004; H04N 7/17309; H04N 7/17318; H04N 7/17354; H04N 21/6168; H04N 24/611; H04N 24/6118; H04B 17/318; Y02B 60/50
USPC ...... 455/63.1, 69, 127.1, 450, 522; 370/242, 370/252, 280, 281, 310, 311, 318, 320, 370/321, 328, 329, 331, 332, 335, 337, 370/345, 347; 375/144, 260, 297
See application file for complete search history.

(56) References Cited

U.S. PATENT DOCUMENTS

| | | | |
|---|---|---|---|
| 7,103,350 B2 | 9/2006 | Au et al. | |
| 7,412,254 B2 | 8/2008 | Malladi et al. | |
| 7,609,661 B2 | 10/2009 | Chae et al. | |
| 7,733,977 B2 | 6/2010 | Kuri et al. | |
| 8,116,805 B2 | 2/2012 | Das et al. | |
| 8,160,602 B2 | 4/2012 | Wu et al. | |
| 8,311,055 B2 | 11/2012 | Senarath et al. | |
| 9,386,564 B2* | 7/2016 | Jiang .................. | H04B 17/382 |
| 2004/0141483 A1 | 7/2004 | Zeira et al. | |
| 2005/0220176 A1 | 10/2005 | Zeira et al. | |
| 2006/0094363 A1 | 5/2006 | Kang et al. | |
| 2006/0094372 A1 | 5/2006 | Ahn et al. | |
| 2006/0209767 A1 | 9/2006 | Chae et al. | |
| 2007/0189234 A1 | 8/2007 | Heo et al. | |
| 2007/0191050 A1* | 8/2007 | Chang ................. | H04W 52/146 |
| | | | 455/522 |
| 2007/0254652 A1 | 11/2007 | Khan et al. | |
| 2007/0265026 A1* | 11/2007 | You .................... | H04W 52/10 |
| | | | 455/522 |
| 2008/0069028 A1 | 3/2008 | Richardson | |
| 2008/0096568 A1 | 4/2008 | Jeong | |
| 2008/0130527 A1 | 6/2008 | Huh et al. | |
| 2008/0146154 A1 | 6/2008 | Claussen et al. | |
| 2008/0166976 A1 | 7/2008 | Rao | |
| 2008/0220806 A1* | 9/2008 | Shin .................... | H04W 52/08 |
| | | | 455/522 |
| 2008/0232332 A1 | 9/2008 | Kaminski et al. | |
| 2008/0280638 A1 | 11/2008 | Malladi et al. | |
| 2009/0082026 A1* | 3/2009 | Yavuz ................. | H04W 52/243 |
| | | | 455/446 |
| 2009/0125363 A1 | 5/2009 | Frederiksen et al. | |
| 2009/0196192 A1 | 8/2009 | Lim et al. | |
| 2009/0258665 A1 | 10/2009 | Bourlas et al. | |
| 2010/0027688 A1 | 2/2010 | Suh et al. | |
| 2010/0041428 A1* | 2/2010 | Chen ................... | H04W 52/16 |
| | | | 455/522 |
| 2010/0128687 A1 | 5/2010 | Oteri et al. | |
| 2010/0142455 A1* | 6/2010 | Imamura ............. | H04W 52/146 |
| | | | 370/329 |
| 2010/0173638 A1 | 7/2010 | Alba et al. | |
| 2010/0189080 A1 | 7/2010 | Hu et al. | |
| 2010/0210295 A1* | 8/2010 | Koc ................... | H04W 52/146 |
| | | | 455/522 |
| 2010/0304776 A1 | 12/2010 | Wu et al. | |
| 2011/0039569 A1 | 2/2011 | Narasimha et al. | |
| 2011/0039589 A1 | 2/2011 | Skov | |
| 2011/0103287 A1 | 5/2011 | Ma et al. | |
| 2011/0111766 A1* | 5/2011 | Yang .................. | H04W 52/241 |
| | | | 455/452.2 |
| 2011/0136533 A1 | 6/2011 | Senarath et al. | |
| 2011/0177821 A1 | 7/2011 | Senarath et al. | |
| 2011/0194423 A1* | 8/2011 | Cho .................... | H04W 52/04 |
| | | | 370/252 |
| 2011/0310879 A1 | 12/2011 | Wu et al. | |
| 2012/0252524 A1 | 10/2012 | Gora et al. | |
| 2012/0270582 A1 | 10/2012 | Mese et al. | |
| 2013/0188576 A1 | 7/2013 | Chao et al. | |

FOREIGN PATENT DOCUMENTS

| | | |
|---|---|---|
| CN | 101272172 | 9/2008 |
| CN | 101272388 | 9/2008 |
| CN | 101305538 | 11/2008 |
| CN | 101370240 | 2/2009 |
| CN | 101371459 | 2/2009 |
| CN | 101378299 | 3/2009 |
| CN | 101399572 | 4/2009 |
| CN | 101584129 | 11/2009 |
| CN | 101626260 | 1/2010 |
| EP | 1811686 | 7/2007 |
| EP | 2056614 | 6/2009 |
| EP | 2510729 | 10/2012 |
| JP | 2008072722 | 3/2008 |
| JP | 2008533923 | 8/2008 |
| JP | 2009523358 | 6/2009 |
| WO | 0057576 | 9/2000 |
| WO | 2008073013 | 6/2008 |
| WO | 2008107930 | 9/2008 |
| WO | 2008076940 | 6/2009 |
| WO | 2009100567 | 8/2009 |
| WO | 2009138841 | 11/2009 |

OTHER PUBLICATIONS

Jalali, A., et al., "Data Throughput of CDMA-HDR a High Efficiency-High Data Rate Personal Communication Wireless System," IEEE 51st Vehicular Technology Conference Proceedings, 2000, pp. 1854-1858, vol. 3.

"3rd Generation Partnership Project, Evolved Universal Terrestrial Radio Access (E-UTRA); Medium Access Control (MAC) protocol specification," Technical Specification 136.321, Jan. 2009, pp. 1-44, vol. 8.4.0.

(56) References Cited

OTHER PUBLICATIONS

3GPP Lte ETSI, ETSI TS 136 213, V8.8.0, "Evolved Universal Terrestial Radio Access (E-UTRA): Physical layer procedures (3GPP TS 36.213 Release 8)," Oct. 2009, 79 pages.
"3rd Generation Partnership Project; Technical Specification Group Radio Access Network; Evolved Universal Terrestrial Radio Access (E-UTRA); Physical layer procedures (Release 8)," 3GPP TS 36.213 V8.8.0, Sep. 2009, 77 pages.
"3rd Generation Partnership Project; Technical Specification 36.213 Group Radio Access Network; Evolved Universal Terrestrial Radio Access (E-UTRA); Physical Layer Procedures, Release 8," Technical Spicification, 3GPP TS 36.213, vol. 8.6.0, Mar. 2009, pp. 1-77.
CHTTL, "Further Simulation Results of User Grouping Methods for Downlink Inter-cell interference coordination," R1-083104, 3GPP TSG-RAN WG1 #54, Jeju, Korea, Aug. 18-22, 2008, 6 pages.
First Chinese Office Action received in Chinese Application No. 201080055385.1 dated Oct. 13, 2014, 6 pages.
Dahlman, E., et al. "Key Features of the LTE Radio Interface," Ericsson Review No. 2, 2008, pp. 77-80.
Extended European Search Report from European Patent Application No. 11734371.5-2412/2471327, PCT/CN2011/070409 dated Jun. 6, 2012, 9 pages.
Extended European Search Report and Suplementary European Search Report received in European Application No. 10835481, dated Dec. 13, 2012, 9 pages.
Foschini, G. J. et al., "A Simple Distributed Autonomous Power Control Algorithm and its Convergence," IEEE Transactions on Vehicular Technology, vol. 42, No. 4, Nov. 1993, pp. 641-646.
Gjendemsjo, A. et al., "Binary Power Control for Sum Rate Maximization over Multiple Interfering Links," IEEE Transactions on Wireless Communications, vol. 7, No. 8, Aug. 2008, pp. 3164-3173.
Halpern, S. W., "Reuse Partitioning in Cellular Systems," Proceedings of 33rd IEEE Vehicular Technology Conference, vol. 33, May 1983, pp. 322-327.
Hande, P. et al., "Distributed Uplink Power Control for Optimal SIR Assignment in Cellular Data Networks," IEEE Communications Society, Proceedings IEEE Infocom, 2006, 13 pages.
PCT International Search Report, PCT/CN2010/079496, Huawei Technologies, Co., Ltd. et al., dated Mar. 17, 2011, 11 pages.
Notification of Transmittal of the International Search Report and the Written Opinion of the International Searching Authority, or the Declaration, Huawei Technologies Co., Ltd., et al., PCT/CN/2010/079496 dated Mar. 17, 2011, 11 pages.
PCT International Search Report, PCT/CN2011/070409, Huawei Technologies Co., Ltd. et al., dated Apr. 12, 2011, 3 pages.
Notification of Transmittal of the International Search Report and the Written Opinion of the International Searching Authority or the Declaration, PCT/CN2011/070409, Huawei Technologies, Co. Ltd., et al., dated Apr. 21, 2011, 3 pages.
International Search Report, PCT International Application No. CN2011/070409, dated Apr. 21, 2011, 3 pages.
Notification of Transmittal of the International Search Report and the Written Opinion of the International Searching Authority, or the Declaration, International Application No. PCT CN2011/070409, dated Apr. 21, 2011, 3 pages.
PCT International Search Report and Written Opinion, PCT/CN2011/070890, Huawei Technologies Co., Ltd. et al., dated May 19, 2011; 9 pages.
International Search Report and Written Opinion received in International Application No. PCT/US13/22143, dated Mar. 29, 2013, 8 pages.
International Search Report received in Chinese Application No. 201080055385.1, dated Sep. 22, 2014, 2 pages.
Notice of Reasons for Rejection recieved in Japanese Application No. 2012-542348 dated Oct. 29, 2013, 4 pages.
Kim, D., et al., Proposed Modification on Power Control Section (AWD-15.3.9.4), IEEE 802.16 Broadbank Wireless Access Working Group, IEEE C802.16m-09/ 1524f1, Jul. 6, 2009, 6 pages.
Knopp, R. "Information Capacity and Power Control in Single-Cell Multiuser Communications," Proceedings of IEEE International Conference on Communications, vol. 1, 1995, pp. 331-335.
Muller, Andreas, "Cooperative Interference Prediction for Enhanced Link Adaptation in the 3GPP LTE Uplink," IEEE, 2010, 6 pages.
Myung, H. G., et al. "Single Carrier FDMA for Uplink Wireless Transmission," IEEE Vehicular Technology Magazine, Sep. 2006, pp. 30-38.
Senarath, G. et al., "Multi-hop Relay System Evaluation Methodology (Channel Model and Performance Metric)," IEEE 802.16 Broadband Wireless Access Working Group, http://ieee802.org/16>, Feb. 2007, 1 page.
Senarah, G. et al., "Power Control and ICIC for Uplink in LTE," Huawei Technologies, Co., Ltd., Aug. 14, 2009, 8 pages.
Written Opinion of the International Searching Authority, International Application No. PCT CN2011/070409, dated Apr. 21, 2011, 4 pages.
Written Opinion of the International Searching Authority, PCT/CN2011/070409, Huawei Technologies Co. Ltd. et al., dated Apr. 12, 2011, 4 pages.
Xiao, W. et al., "Uplink Power Control, Interference Coordination and Resource Allocation for 3GPP E-UTRA," IEEE Vehicular Technology Conference, Sep. 2006, 5 pages.
Yates, R. et al., •Integrated Power Control and Base Station Assignment,• IEEE Transactions on Vehicular Technology, vol. 44, No. 3, Aug. 1995, pp. 638-644.
Yates, R. "A Framework for Uplink Power Control in Cellular Radio Systems," IEEE Journal on Selected Areas in Communications, vol. 13, No. 7, Sep. 1995, pp. 1341-1347.
Zander, J. "Performance of Optimum Transmitter Power Control in Cellular Radio System," IEEE Transactions on Vehicular Technology, vol. 41, No. 1, Feb. 1992, pp. 57-62.

\* cited by examiner

| | |
|---|---|
| NUMBER OF ANTENNAS | 2 eNB AND 1 UE ANTENNAS |
| BS ANTENNA HEIGHT | 32m |
| UE ANTENNA HEIGHT | 1.7m |
| THERMAL NOISE DENSITY | -174 dBm/Hz |
| CHANNEL MODEL | ITU-A WITH 3km/h OR AWGN |
| UE POWER | 24 dBm |
| PENETRATION LOSS | (WITH FAST FADING) |
| PATHLOSS | 128.2 + 36.7*LOG(DISTANCE[km]) |
| SHADOW CORRELATION | 0.5 BETWEEN eNBs - 1 BETWEEN SECTORS |
| SHADOW VARIATION | 8 dB |
| CELL-SIZE | 500m |
| SCHEDULER | PROPORTIONAL FAIRNESS - FSS |
| POWER CONTROL | P_0_cell + P_0_UE + ALPHA * PL |
| HARQ | SYNCHRONOUS ADAPTIVE IR |
| NUMBER OF TRANSMISSIONS | 4 |
| BANDWIDTH | 10 Mhz - 50 RBs |
| NUMBER OF RB FOR UL CCH | 2 |
| ANTENNA PATTERN | 2D WITH 3 dB AT 70 DEGREES |
| NUMBER OF Ues | 24/SECTOR |
| DEPLOYMENT | 19 CELLS/3 SECTOR - WRAPAROUND |
| BS NOISE FIGURE | 5 dB |
| MINIMUM DISTANCE TO eNB | 35m |
| SERVICE | FULL-BUFFER |
| MCS LEVELS | QPSK, 16 QAM, 64 QAM |
| Link2System | EESM |
| CHANNEL ESTIMATION | IDEAL |
| BS ANTENNA GAIN | 15 dB |
| BS NOISE FIGURE | 5 dB |
| UE ANTENNA GAIN | 0 dB |
| SOUNDING | 10 TTI |

FIG. 6

SYSTEM AND METHOD FOR POWER CONTROL

This application is a continuation of U.S. patent application Ser. No. 12/633,657 filed on Dec. 8, 2009, entitled "System and Method for Power Control," which is incorporated herein by reference as if reproduced in its entirety.

TECHNICAL FIELD

The present invention relates generally to wireless communication systems, and more particularly to a system and method for power control.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

An illustration of a conventional mobile broadband system 100 is illustrated in FIG. 1. Mobile broadband system is divided into cells 108, 110 and 112, where each cell 108, 110 and 112 has corresponding base station 102, 104 and 106. Mobile terminals or user equipment (UE) 116 and 114 access network 100 through one of base stations 102, 104 and 106. Three base stations 108, 110 and 112 and two UEs 114 and 116 are used for simplicity of illustration, however, multiple cells and UEs can be used and provided for in real systems.

In communication systems such as CDMA and LTE, bandwidth is shared among terminal devices or UEs in the uplink communications channel. Because bandwidth is shared, power control is used in the uplink communications to address the near-far effect. This means that UE 114 at the cell edge with higher path loss PL2 to base station 102 will generally transmit with a higher power than UE 116 with lower path loss PL1 so that each respective transmission is received at a reasonable level above noise and interference.

The prior art has addressed the power control in a couple of ways. Under the full power control (FPC) scheme, the received signal level of all UEs are about the same at the base station in order to provide equal signal to noise and interference ratio (SNIR) for all users. Under FPC, the UE power is set to fully compensate for the channel loss, thus all users have same received signal level $P_o$ at the base station:

$$P_0 = \{10 * \log 10(N + I_0) + \text{SNIR}_{TARG}\}, \quad (1)$$

where, $I_0$ is the estimated total interference power at the base station, N is the thermal noise power, and $\text{SNIR}_{TARG}$ is the target SNIR. The transmit power at the UE under FPC is given by:

$$P_f = \{P_{max}, P_0 + \text{PL}\}, \quad (2)$$

Where $P_{max}$ is a maximum transmit power a UE is allowed to transmit and PL is the path loss. It can be seen that using FPC, all UEs have the same SNIR if the target SNIR is the same for all UEs and if UE power is not limited by $P_{max}$. When FPC is used, however, the same modulation and coding scheme (MCS) level is typically used by all the UEs, which potentially results in a reduced system throughput because higher MCS levels are not used.

The fractional power control (FrPC) scheme proposed in the LTE standard allows users with lower path loss to use a higher power level than would be otherwise required to maintain a minimum SNIR threshold. The allowed margin above the cell edge SNIR is inversely proportional to the path loss of the user, so that a user in closer proximity to the base station can obtain a higher SNIR and a higher MCS level. The transmitter power of a UE under FrPC is expressed as:

$$P_{tx} = \{P_{max}, P'_0 + \alpha \cdot \text{PL}\} \text{ and } P'_0 = P_0 + \Delta_0,$$

where $\alpha$ is a multiplier that is less than 1, and $\Delta_0$ is a power increase factor set such that the cell-edge UEs still achieves the target SNIR. (When $\alpha$ is equal to 1, the system operates as a FPC system.) Under FrPC, UEs that are closer to the base station can boost power above the point that would have been set by FPC, where the increase in power $\Delta P$ is given by:

$$\Delta P = (1-\alpha) \times (\text{PL} - \text{PL}_{cell\_edge}),$$

so that $P_{tx} = \Delta P + P_f$.
where $\text{PL}_{cell\_edge}$ is the path loss from the cell edge UE to the base station.

UEs closer to the base station, therefore, have a higher SNIR than UEs farther from the base station. While FrPC shows some improvement over FPC schemes, FrPC chooses UE transmission levels based on a UE path loss and not based on the actual interference level being caused by the UE. Consequently, FrPC power control may not effectively reduce interference in some cases.

What is needed are systems and method of power control for multiple access wireless networks that increase throughput and minimize interference.

SUMMARY OF THE INVENTION

In accordance with an embodiment of the present invention, a method for transmit power control is provided. In this example, the method includes determining a downlink signal to noise ratio (SNIR) between a served user equipment (UE) and a serving base station, computing an uplink transmit power level as a function of the downlink SNIR, and performing an uplink transmission over physical uplink shared channel (PUSCH) resources in accordance with uplink transmit power level. An apparatus for performing this method is also provided.

In accordance with another embodiment of the present invention, another method for transmit power control is provided. In this example, the method includes receiving a message indicating target interference levels associated with neighboring base stations, computing an uplink transmit power level as a function of the target interference levels associated with the neighboring base stations, and performing an uplink transmission over the PUSCH resources in accordance with uplink transmit power level. An apparatus for performing this method is also provided.

In accordance with yet another embodiment, yet another method for transmit power control is provided. In this example, the method includes receiving a message indicating current interference levels associated with neighboring base stations, computing an uplink transmit power level as a function of the current interference levels associated with the neighboring base stations, and performing an uplink transmission over physical uplink shared channel (PUSCH) resources in accordance with uplink transmit power level. An apparatus for performing this method is also provided.

In accordance with yet another embodiment, yet another method for transmit power control is provided. In this example, the method includes receiving an instruction from a serving base station. The instruction instructs a served UE to iteratively reduce an uplink transmit power level of the served UE until an interference level experienced by a neighboring base station has fallen below a threshold. The method further includes iteratively reducing the uplink transmit power level of the served UE over a sequence of time intervals until an instruction to resume a normal power control procedure is received from the serving base station. An apparatus for performing this method is also provided.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 6 is an embodiment system parameter chart;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, namely power control in a broadband wireless networks. The invention may also be applied to power control in other types of networks.

In embodiments of the present invention, power control systems and method are implemented that control the uplink transmit power of UEs based on total interference pollution to other cells. The impact of a UE's interference on the throughput of other cells is taken into account when determining UE transmit power. In embodiments, total interference pollution is calculated by summing UE generated interference to every other cell normalized by the expected mean interference level of the cell receiving the interference. This expected mean interference is used as a loading factor for each cell, which is measured and shared with neighboring cells so that the UEs in the neighbor cells can use that as target interference level for that cell.

Figure 1:
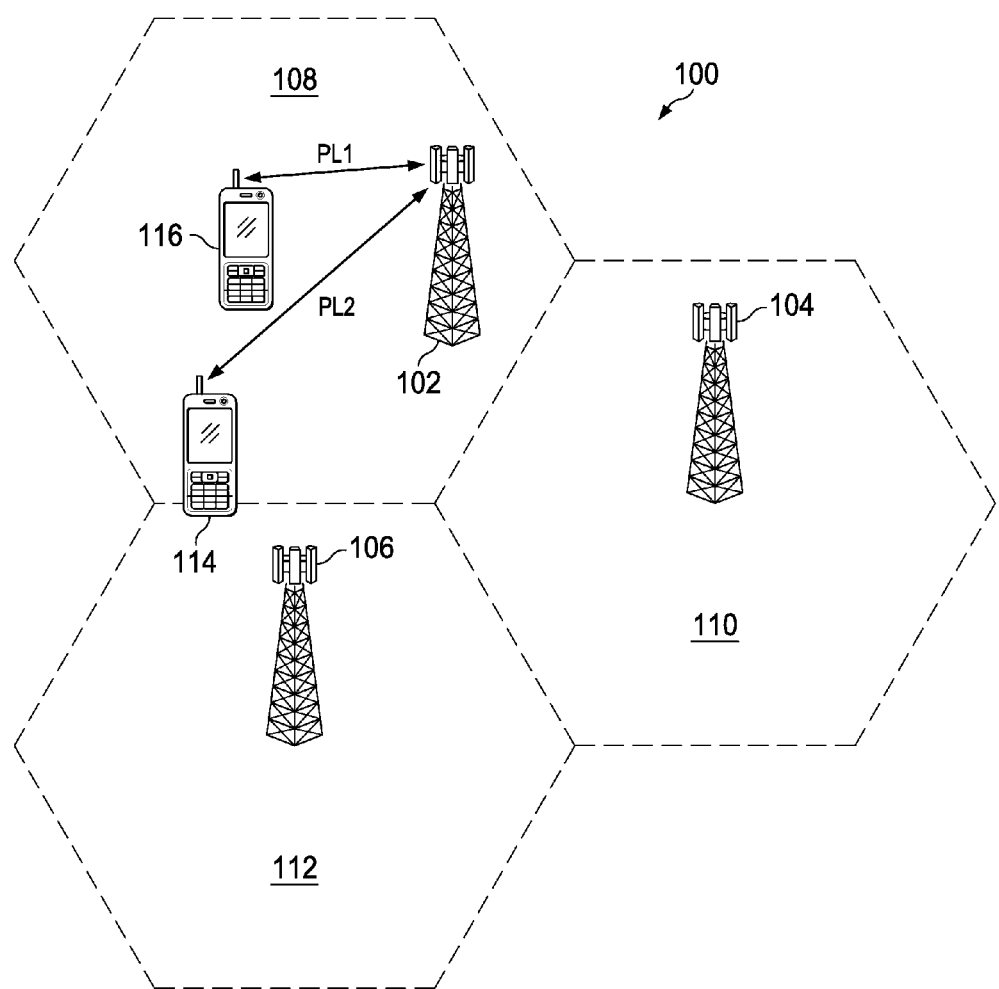
FIG. 1 illustrates a diagram of a conventional mobile broadband system.
Figure 2:
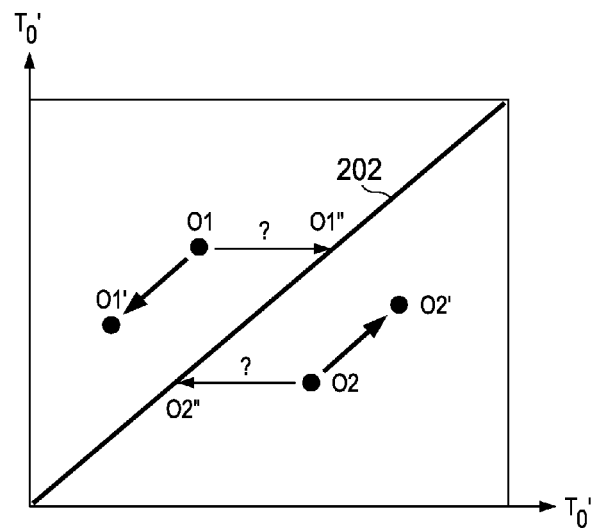
FIG. 2 illustrates a graph showing the relationship between various operating points and an optimal pollution curve.

FIG. 2 illustrates a graph showing the relationship between various operating points with respect to optimal pollution curve 202. In some embodiments, when the power of a UE is increased, assuming a neighbor cell target mean interference threshold of Ti=T0, the resulting interference of each cell would not equal T0 and it would not be a fixed value either. Rather, the resulting interference would be a value that varies in time depending on interference from other cells. Therefore, not all of the base stations will operate in the optimum point according to some embodiments of the present invention. If the realized mean interference received by a base station is larger than the target, $T_0$, an embodiment power adjustment provides a larger power increase than that required to operate in the optimum point. To prevent this from happening, the system increases power some margin $\Delta_2$ below the limit given by the target. Because all UEs are operating using the same algorithm, the actual interference level will also be reduced (point O1 moves to point O1', assuming that the system is not power limited at O1), and the system cannot reach the preferred operating point by changing $\Delta_2$. Similarly, if the actual/experienced total interference level (T0') is smaller than target T0, increasing UE power does not move the operating point close to the optimum pollution curve (point O2 moves to point O2'). In embodiments of the present invention, the power of different UEs are therefore varied by different amounts to achieve operating points close to optimal pollution curve 202. As explained later in this disclosure, this is done in some embodiments using a parameter beta so that different UEs have different adjustments than the target, or by making the $\Delta_2$ value dependent on the UE (UE dependent $\Delta_2$ value). As explained herein, this is done based on the interference measurements performed by neighboring base stations in some embodiments. For example, operating point O1 to shifts to point O1" and operating point O2 to shifts to point O2" by an embodiment method.

In an embodiment used for inter-cell interference coordination (ICIC) for different resource blocks (RBs), different interference target levels are derived for different eNB groups and/or different groups of base stations, which are known apriori by the neighboring cells. The ratio of the target interference level for a specific resource block to the nominal reference target interference level in the system is used to normalize the total interference to these different eNB groups. The interference to other cells is to be measured using downlink measurements if the reciprocity of the channel for medium signal level is valid, or using specific uplink sounding signals.

In embodiments, the UE uplink power is adjusted so as not to exceed a target interference over thermal noise level (TIOT) in an adjacent sector. In some embodiments that account for multiple sectors having multiple target level, for example multi-TIOT ICIC schemes, embodiment power control systems and methods are used to maximize throughput.

Figure 3:
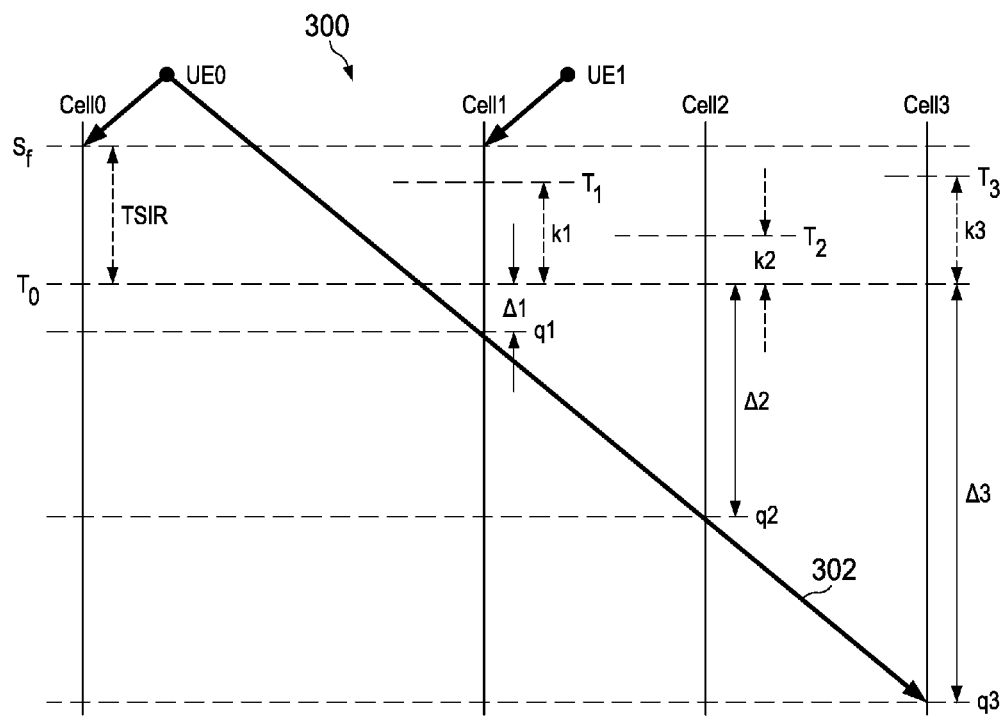
FIG. 3 illustrates a power graph according to an embodiment of the present invention.

FIG. 3 illustrates a power graph 300 according to an embodiment of the present invention. The y-axis of the graph represents transmitted and received power. User equipment UE0 transmits to Cell0 with a path loss of PL0. The signal received by Cell0 is $S_f$. The signal from U0 is also received at neighboring cells Cell1, Cell2 and Cell3 at power levels q1, q2 and q3, respectively, as shown by line 302. Cell0 has an interference target of $T_0$, Cell1, has an interference target of $T_1$, Cell2, has an interference target of $T_2$, and Cell3, has an interference target of $T_3$. In the illustrated embodiment, each interference target represents the amount of total mean interference each cell that achieves a certain level of performance for that cell's UEs. In an embodiment, the interference target can also be the measured instantaneous or mean total interference experienced by each neighbor for that resource block, in which case, this information is shared with the neighboring stations. In the illustrated embodiment, Cell1 receives UE0's signal at a level Δ1+k1 below the target interference level of $T_1$, Cell2 receives the signal at a level Δ2+k2 below the target interference level of $T_2$, and Cell3 receives the signal at a level Δ3+k3 below the target interference level of $T_3$.

It can be seen that the impact of adding an extra interference (q0) to a base station with a higher interference level $T_1$, is smaller than the impact on a base station with a lower interference level, $T_2$. This is because, 10*log 10((q0+T1/T1)<10*log 10((q0+T2)/T2) if T1>T2. Therefore, in an embodiment, when determining the total interference pollution level, interference is weighted according to the average/target interference level existed/expected before the addition.

In an embodiment of the present invention, it is assumed that different base stations have different interference tolerance levels, T0 in a given RB, which is decided by each base station or dynamically changed under a radio resource management (RRM) scheme, where other neighboring base stations aware of these thresholds.

In an embodiment the power of the UE is set to be:

$$P_f + \Delta P,$$

where $P_f$ is the FPC transmit level defined in equations (1) and (2) and ΔP is an offset from the FPC transmit level.

In an embodiment, ΔP is set to be.

$$\Delta P = \beta\left(S_f - 10\log\left(\sum_i \left(\frac{q_i}{\lambda_i}\right)\right)\right) - \Delta 2,$$

where $q_i$ is the respective interference levels caused by the UE, β and Δ2 are parameters to be found using simulations and depend on the environmental conditions and cell planning; $\lambda_i$ is the ratio between target interference at $i^{th}$ cell and a reference interference level, T0. In an embodiment, if the thermal noise is taken as a reference level, is the target interference power over target thermal power (IOT) of the cell.

A more general expression for ΔP is:

$$\Delta P = f(\delta P), \text{ where}$$

$$\delta P = S_f - 10\log\left(\sum_i \left(\frac{q_i}{\lambda_i}\right)\right).$$

Figure 4:
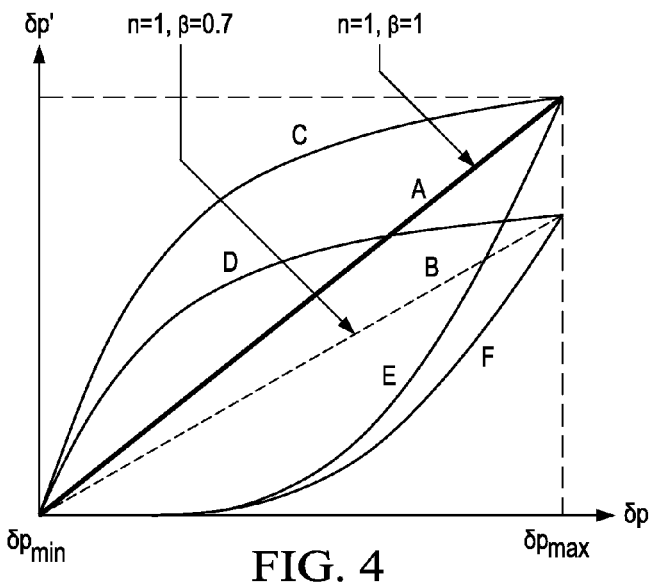
FIG. 4 illustrates embodiment 0 curves.

In an embodiment, $f$ is a monotonic function chosen to keep UE power levels within a specified range and to achieve a desired tradeoff between cell edge performance and cell center throughput. For example, $f$ can be in the form of $$f(x) = \beta x^n, \text{ so that}$$

$$\Delta P = \delta P_{min} + \beta\left(\frac{\delta P - \delta P_{min}}{\delta P_{max} - \delta P_{min}}\right)^n,$$

where $\delta P_{min}$ is the minimum value of δP over all the UEs in the cell and $\delta P_{max}$ is the maximum value of δP over all the UEs in the cell. Examples of various curves for $f(x) = \beta x^n$ is illustrated in FIG. 4. Curve A represents the case where β=1 and n=1; curve B represents the case where β=0.7 and n=1. Embodiments employing curve B provide power adjustments for higher margin UEs that are linearly reduced according to the path loss. Curves C, D, E and F correspond to embodiments that non-linearly adjust the power using different functions to treat cell centers differently than cell-edge users as shown below. In embodiments, n and β are found using simulation and optimization techniques known in the art.

In another embodiment, an adaptive algorithm dynamically adjusts the parameter β. Neighboring cells inform the base station when the average interference level over a some period exceeds a margin. Depending on the margin, β is adjusted to increase or decrease the interference to the neighboring cells. This adjustment may be done to the users which generate high levels of interference to particular neighboring cells.

In an embodiment an adaptive method uses simulations to achieve a specified fairness. A system throughput is measured, and if the local base station fairness is better/worse than a specified fairness, then beta is increased or decreased by a certain amount. The results of the simulation are used to fix a start value, and the adaptive method is used to adjust the simulation dynamically. The amount by which the simulation is adjusted is determined according to simulation techniques known in the art.

In another embodiment, an adaptive method uses simulations that are changed dynamically for a given base station for one value of Δ2. If a neighboring base station wants to change the operating point by changing its interference, only a Δ2 value of a UE is changed that interferes with a neighboring base station. If the neighboring base station wants to reduce or increase interference to it, Δ2 is increased or decreased by a small amount. The amount by which Δ2 is increased or decreased by a small amount is determined according to simulation techniques known in the art.

In an embodiment, where target interference levels are the same in adjoining cells, δP can be simplified as:

$$\Delta P = S_f - 10*\log 10(\Sigma(q_i/\lambda_i)) = S_f - 10*\log 10(\Sigma(q_i)) + \Delta 3.$$

Without loss of generality, Δ3 can be set to be 0. Therefore, $$\Delta P = \beta \cdot (S_f - 10*\log 10(\Sigma(q_i))) - \Delta 2,$$

where $\Sigma(q_i)$ is the total mean interference a UE causes to all the other cells. The above adjustment, ΔP can be directly estimated from a mean downlink SNIR:

$$SNIR_{DL} = \frac{p_{DL}l_d}{\sum_i p_{DL}l_i + N_0} \approx \frac{l_d}{\sum_i l_i} =$$

$$\frac{p_{tx}l_d}{\sum_i p_{tx}l_i} \approx \frac{s_f(\,= UL \text{ received power at serving cell})}{\sum_i q_i(\,= UL \text{ total interference to neighbours})},$$

where $P_{DL}$ is the downlink transmit power of the base stations, $l_d$ is the downlink path loss from the serving cell $l_i$ is downlink path loss from the ith neighbor base station, and $N_0$ is the thermal noise. Therefore, $\delta P = SNIR_{DL}$ (in dB). When n=1, the power transmitted at the UE is:

$$P_{tx} = P_f + \beta SNIR_{DL} - \Delta 2.$$

This will be referred to an embodiment Geometry Based Power Control (GPC) scheme.

In alternative embodiments, GPC schemes can be modified. For example, in order to increase the cell-edge throughput with minimal impact to overall system throughput, the UE transmit power can be adjusted when ΔP is positive (i.e. δP=max(δP,0). In an embodiment, the total UE transmit power is determined according to:

$$P_{tx} = P_f + \beta SINR_{DL} - \beta 2, \beta \cdot SNIR_{DL} \geq \Delta 2$$

$$P_{tx} = P_f, \beta \cdot SNIR_{DL} \geq \Delta 2.$$

This will be referred to as an embodiment capped Geometry Based Power Control (GPC-Cap) scheme. In a further embodiment, a MTPC-cap scheme can be defined as a method where if the overall power adjustment factor ΔP is negative, ΔP is set to zero.

In an embodiment, there are several groups of base stations, each group of which share a common interference threshold level. For a system with three base station groups:

$$\delta P = S_f - 10*\log 10((\Sigma(q_{1j})/\lambda_1) + \Sigma(q_{2j})/\lambda_2) + \Sigma(q_{3j})/\lambda_3)),$$

where λ1, λ2, and λ3 are the relative TIOT levels associated with each BS group, and $(\Sigma(q_{1j})\lambda_1)$, $(\Sigma(q_{2j})/\lambda_2)$ and $(\Sigma(q_{3j})/\lambda_3)$ represent the impact of the total interference a UE causes to each base station group weighted by their target interference levels. In an embodiment, these interferences can be evaluated using downlink pilot power measurements or special pilot arrangements (e.g. introducing common pilots to each base station group). This will be referred to as an embodiment Multi-Target Power Control (MTPC) scheme.

In an embodiment, at least one of the neighboring base stations adjusts its pilot power level according to a mean interference over threshold level IOT of another one of the neighboring base stations. The expression $$\sum_i \left(\frac{q_i}{\lambda_i}\right)$$

is then evaluated using the downlink SNIR of the pilot signal.

In an embodiment, neighboring base stations use a common pilot signal, and the UE measures a total power of the common pilot signal I, and a desired signal level S from the serving base station. The downlink SNIR is then evaluated according to the expression, SNIR=S/(I−S).

In another embodiment, an iterative scheme is used to follow the interference pollution based scheme in a way that makes less assumptions for all UEs. For example, an optimum power level at which the increase in power of a UE would cause decrease in total throughput is found such that increase in throughput is lower than the decrease of throughput in the other cells. The total throughput of all the cells is determined as:

$$Q = \log_2(1 + p \cdot L_0/q_0) + \sum_i [\log_2(1 + S_i/(Ti + p \cdot L_i))],$$

where p is the UE uplink transmit power, $L_0$ is the uplink path loss to the serving station, $q_0$ is total interference plus noise received by the serving base station from the UEs in the neighbor base stations, $L_i$ is uplink path loss to the $i^{th}$ neighboring base station $S_i$ is the expected received signal level for a UE served by the $i^{th}$ neighboring station, and $T_i$ is the total interference plus noise power, received by the $i^{th}$ neighboring base station.

Let, $$\frac{\delta Q}{\delta p} = 0 ==> \frac{L_0/q_0}{1 + p \cdot L_0/q_0} = \sum_i \frac{1}{1 + \frac{S_i}{Ti + p \cdot L_i}} \cdot \frac{S_i \cdot L_i}{(Ti + p \cdot L_i)^2}.$$

Therefore, $$p(n) = \frac{1}{\sum_i \frac{S_i \cdot L_i}{(Ti + p(n-1) \cdot L_i + S_i) \cdot (Ti + p(n-1) \cdot L_i)}} - \frac{q_0}{L_0}.$$

An iterative scheme is then used to find the optimum power for each UE assuming fixed target Si and known Ti's for all the other cells.

In an embodiment, each UE (or eNB) starts the above iteration with initial value (n=1) of p(n−1)=p(0)=pf (transmit power under full power control). Then, p(n=2) is evaluated. Similarly p(n) is found for larger values of n until the change is small. A fixed target Si and known Ti's are assumed for the other cells.

In an iterative embodiment, a fairness requirement is not considered when the optimum power level is determined through iteration. It considered in the case when throughput gain of the desired cell is greater than the sum of the throughput losses in other cells, or $$\sum_i \log C(i) > 0,$$

where C(i) is the throughput for the UE in cell i. Instead, when a fairness requirement is considered, $$\sum_i w(i) \log C(i) > 0$$

is used for the iterative scheme, where w(i) is a weighting factor for the $i^{th}$ cell.

Figure 5:
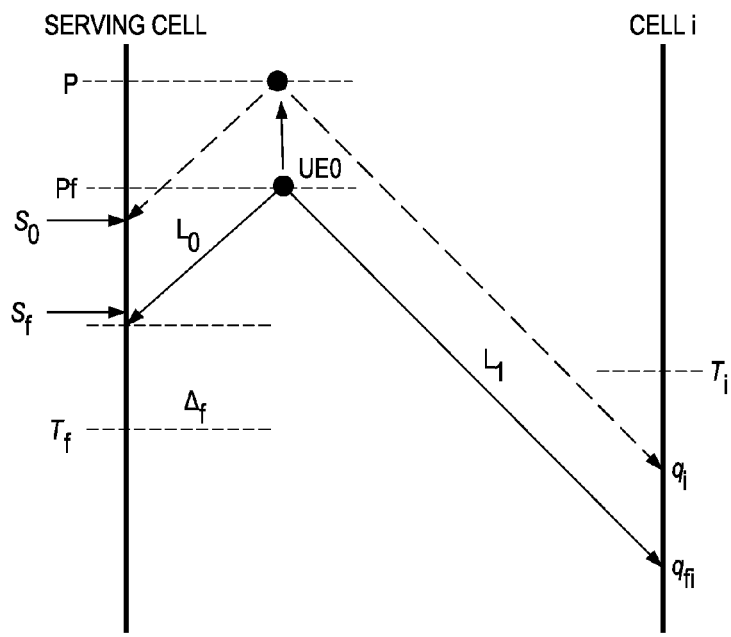
FIG. 5 illustrates an embodiment power graph.

FIG. 5 illustrates a power graph showing the relationship between the transmit power of UE2 with the received power from UE0 at a serving cell and at cell i. Assume at a given UE transmit power level P, the received signals at different BSs are qi, where i=[1 . . . n]. Let S0 represent the serving base station received signal. Ti is the sum of all the other cell interference in cell I (without this test terminal UE0). When P is very large, the interference to other cells are well above the total interference they receive from other UEs. At this point, if the UE power is increased by a small amount, the cost of interference pollution (i.e. throughput loss) from that increase is higher than the corresponding gain (throughput) in the desired cell. In an embodiment, an optimal threshold is found, over which the increase of UE power provides lower performance solution to the system. When p is increased by Δp, assume qi is increased by Δqi, Ti by ΔTi, and Si by ΔSi:

Throughput Gain =
$$\log_2(1 + (S_0 + \Delta s)/q_0) - \log_2(1 + S/q_0) \approx \log_2((S_0 + \Delta S_0)/S_0),$$
assuming $S_0 \gg q_0$.

(desired link) = $\log_2(1 + \Delta S_0/S_0) = \log_2(1 + \Delta P/P)$, where $\{S_0 = P/L_0, \Delta S_0 = (P + \Delta P)/L_0 - P/L_0 = \Delta P/L_0\}$.

Throughput Loss =
$$\sum_i [\log_2(1 + S_i/T_i) - \log_2(1 + S_i/(T_i + \Delta T_i))] \approx \sum_i \log_2((T_i + \Delta T_i)/T_i),$$

assuming $S_i > T_i$.

(other cells) = $\sum_i \log_2(1 + \Delta T_i/T_i) = \log_2 \prod_i (1 + \Delta T_i/T_i) =$ $$\log_2\left(1 + \sum_i (\Delta T_i/T_i) + \sum_{i,j} (\Delta T_i/T_i) \cdot (\Delta T_j/T_j) + \ldots \right) \approx$$

$$\log_2\left[1 + \sum_i (\Delta q_i/T_i)\right].$$

Figure 7:
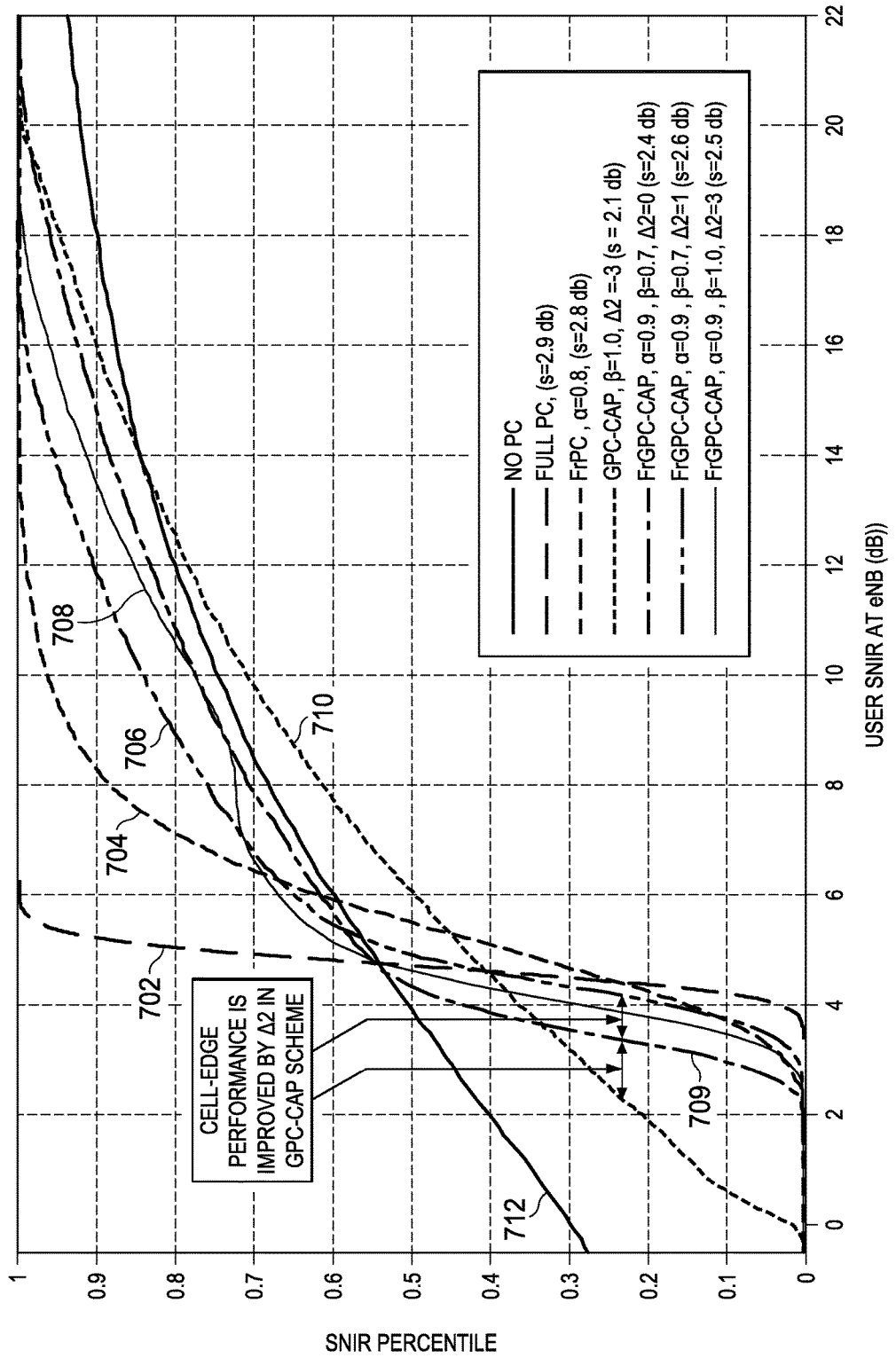
FIG. 7 illustrates an embodiment cumulative distribution function.

FIG. 6 lists the parameters of an example embodiment. FIG. 7 illustrates a cumulative distribution function of SNIR for the case of a Single TIOT under additive white Gaussian noise (AWGN) comparing the performance of various power control schemes according to the system parameters of FIG. 6. Curve 712 represents a system in which no power control is provided; and curve 702 represents a system in which a full power control scheme (FPC) is used. Curve 704 represents a system where fractional power control (FrPC) is used with α=0.8, which results in s=2.8 dB, where s is the standard deviation of IOT variation at the base stations. Curve 710 represents a system in which an embodiment GPC-cap power control method is used with β=1.0 and Δ2=−3, which results in s=2.1 dB. Curve 709 represents a system in which an embodiment FrGPC-cap power control method is used where α=0.9, β=0.7, Δ2=0. FrGPC-cap is a power control scheme in which the GPC-cap power adjustment is implemented on top of FrPC scheme instead of the FPC scheme, which results in s=2.4 dB. Curve 709 represents a system in which an embodiment FrGPC-cap power control method is used where α=0.9, β=0.7, Δ2=0, thereby resulting in s=2.4 dB. Curve 706 represents a system in which an embodiment FrGPC-cap power control method is used where α=0.9, β=0.7, Δ2=1, thereby resulting in s=2.6 dB). Finally, curve 708 represents a system in which an embodiment FrGPC-cap power control method is used where α=0.9, β=0.7, Δ2=3, resulting in s=2.5 dB. It can be seen that the percent of users having SNIRs less than 3 dB to 4 dB is significantly reduced for the FrGPC-cap method compared to having no power control. The GPC cap (curve 710) and FrGPC-Cap method (curves 706, 708 and 709) has a higher percentage of users having SNIRs greater than 6 dB compared to full power control (curve 702) and fractional power control (curve 704). In summary, embodiment methods allow higher throughput for higher throughput users, as well as allowing for more throughput for low throughput (i.e., cell-edge) users.

Figure 8:
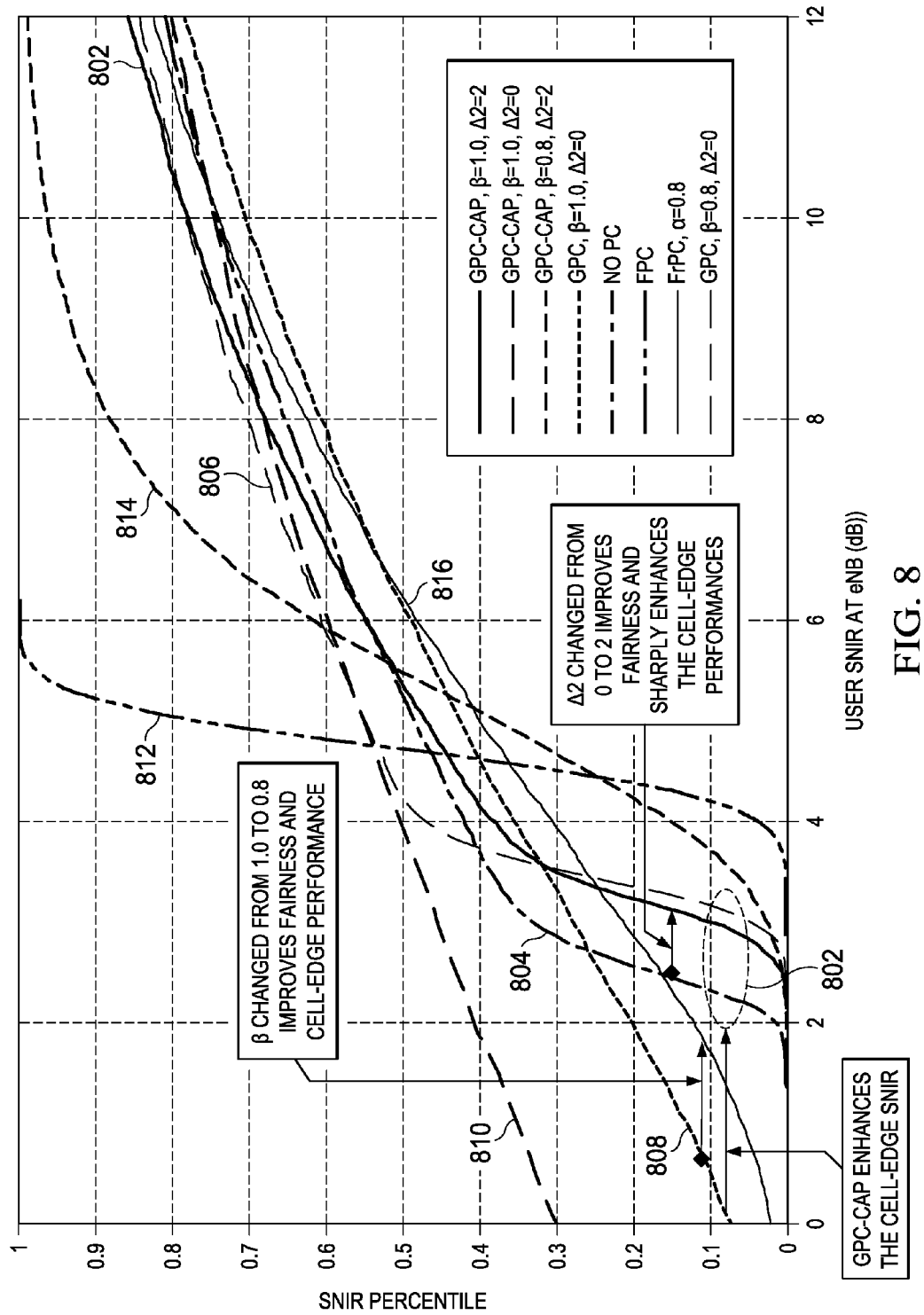
FIG. 8 is a graph illustrating the effect of varying parameters in an embodiment communication system.

FIG. 8 illustrates the effect of varying β and Δ2 on embodiment power control methods for a single TIOT case under AWGN. It can be seen that decreasing β from 1.0 to 0.8 improves fairness and cell-edge performance by lowering the percentage of users with SNIRs of less than 2 dB. (See curves 806 and 816.) It can be further seen that varying Δ2 from 0 to 2 improves fairness and sharply enhances cell edge performance. (See curves 802, 804 and 806.)

Figure 9:
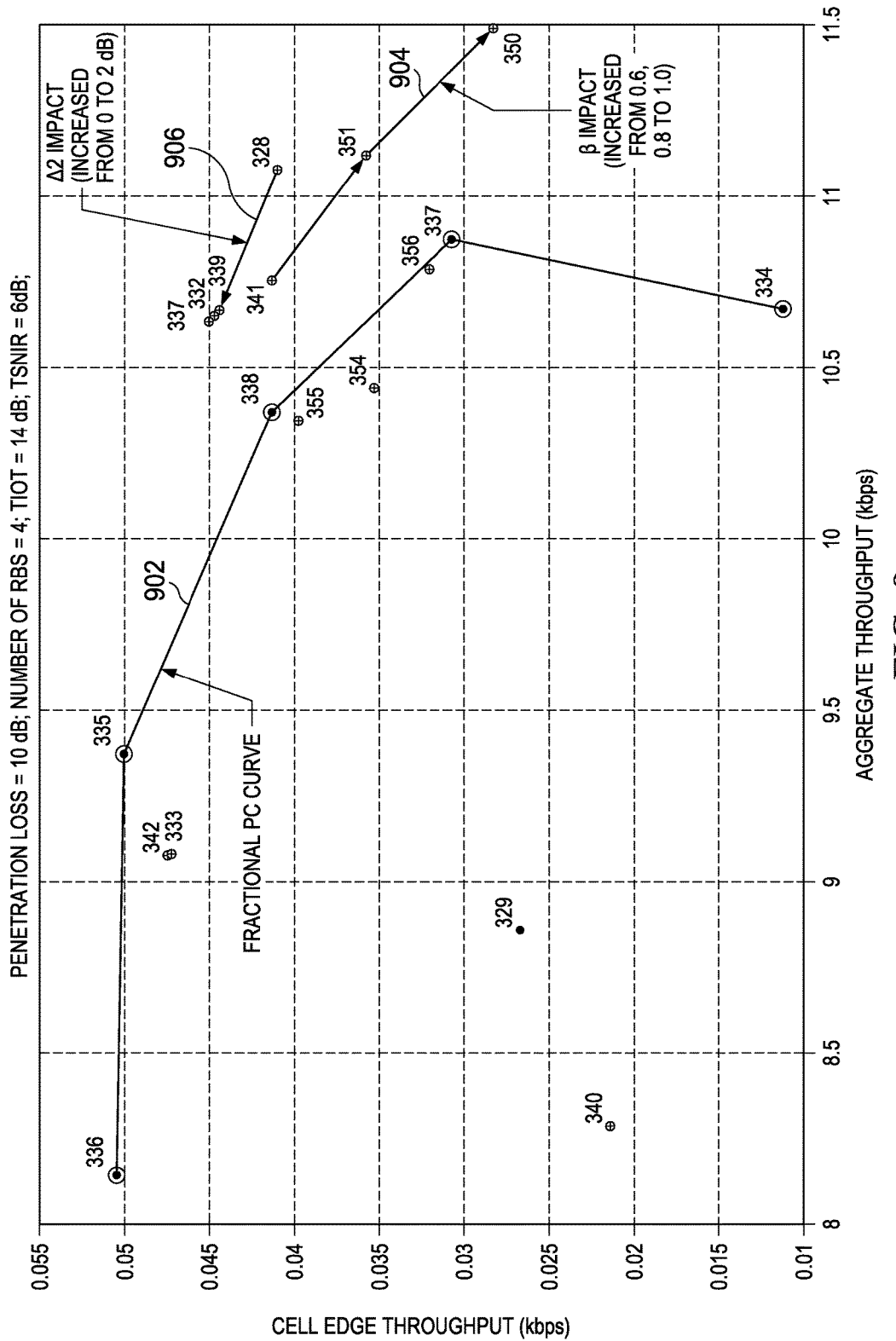
FIGS. 9 and 10 are graphs illustrating the performance of various embodiment power control methods.

FIG. 9 illustrates a comparison of cell-edge throughput v. aggregate throughput for different power control methods for a single TIOT case under AWGN. Curve 902 represents a fractional power control system with different α values; curve 904 represents a GPC-cap system with β varied from 0.6 to 1.0; and curve 906 represents a GPC-cap systems with Δ2 varied form 0 dB to 2 dB.

Figure 10:
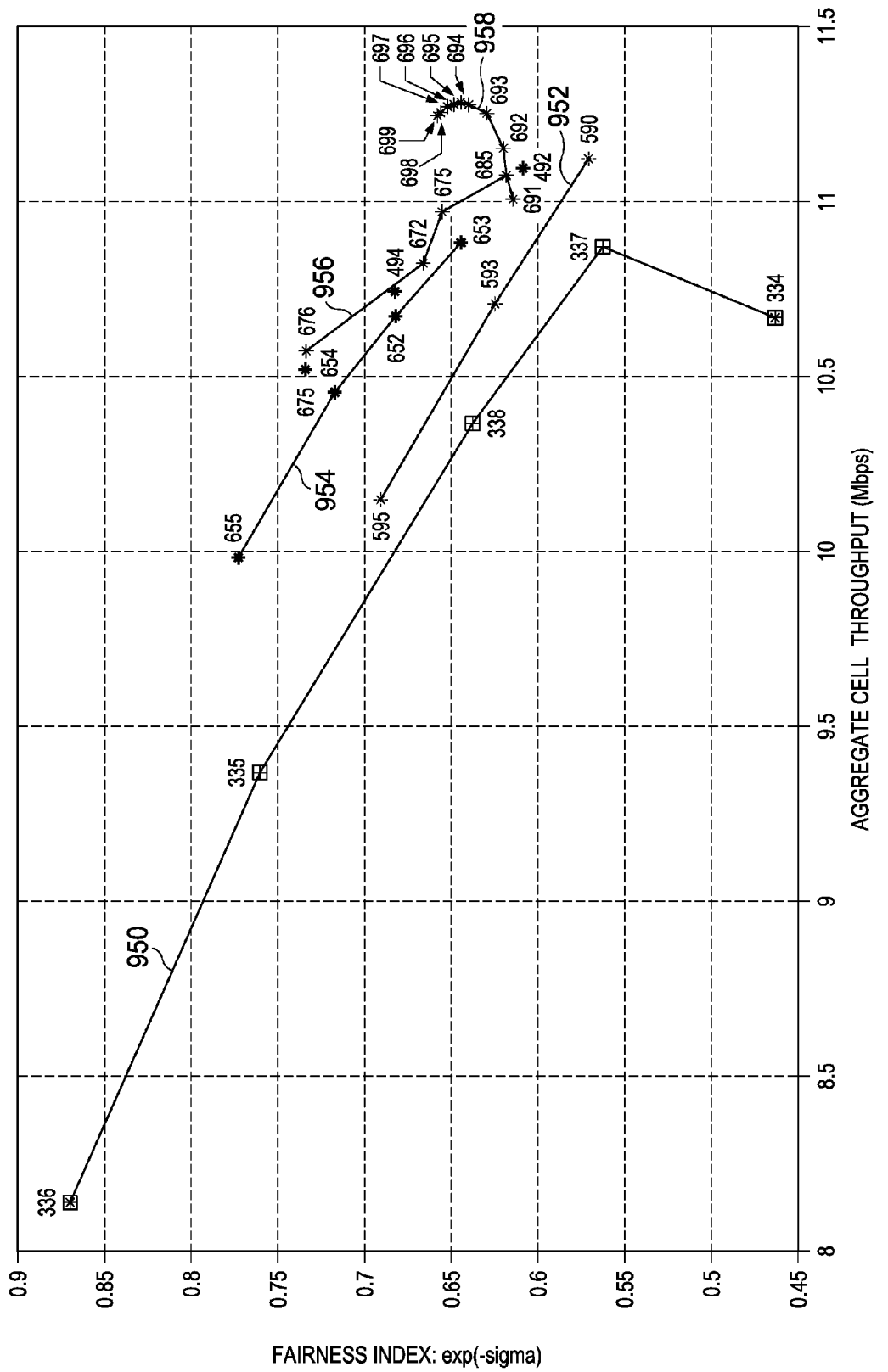

FIG. 10 illustrates a comparison of fairness index v. aggregate cell throughput for different power control methods for multiple target interference over thermal noise level (MULTi-TIOT) cases. The fairness index represents is scaled such that a fairness index of 1 means that all users have the same throughput. Curve 950 represents a fractional power control. Curves 952, 954 and 956 represent GPC power control methods with different intercell interference control (ICIC) scheduling algorithms (single TIOT case), which shows that embodiment schemes provide larger gain when used in combination with different interference control schemes. Curve 958 represents a MTPC power control method applied to a multi-TIOT ICIC scheme. It can be seen that higher average throughputs are achievable using embodiment power control methods.

Figure 11:
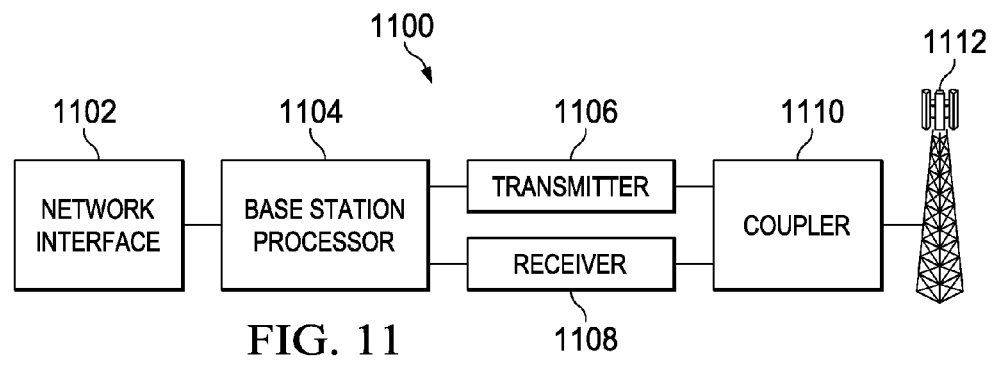
FIG. 11 illustrates a block diagram of an embodiment base station.

A block diagram of an embodiment base station 1100 is illustrated in FIG. 11. Base station 1100 has a base station processor 1104 coupled to transmitter 1106 and receiver 1108, and network interface 1102. Transmitter 1106 and receiver 1108 are coupled to antenna 1112 via coupler 1110. Base station processor 1104 executes embodiment algorithms. In embodiments of the present invention, base station 1100 is configured to operate in a LTE network using an OFDMA downlink channel divided into multiple subbands and using single carrier FDMA in the uplink. In alternative embodiments, other systems, network types and transmission schemes can be used, for example, Wimax, and 1×EV-DO.

Figure 12:
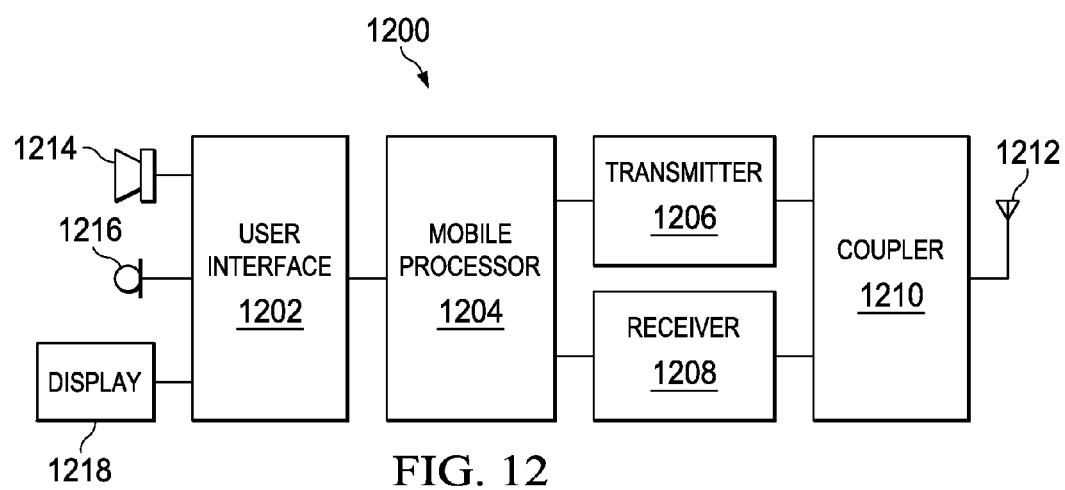
FIG. 12 illustrates a block diagram of an embodiment user device.

A block diagram of an embodiment user device 1200 is illustrated in FIG. 12. User device 1200 can be implemented, for example, as a cellular telephone, or other mobile communication device, such as a computer or network enabled peripheral. Alternatively, user device 1200 can be a non-mobile device, such as a desktop computer with wireless network connectivity. User device 1200 has mobile processor 1204, transmitter 1206 and receiver 1208, which are coupled to antenna 1212 via coupler 1210. User interface 1202 is coupled to mobile processor 1204 and provides interfaces to loudspeaker 1214, microphone 1216 and display 1218, for example. Alternatively, user device 1200 may have a different configuration with respect to user interface 1202, or user interface 1202 may be omitted entirely. In an embodiment, user device 1200 is configured to determine a downlink SNIR by evaluating the expression $$\sum_i \left(\frac{q_i}{\lambda_i}\right).$$

User device 1200 can be further configured to emit a sounding signal.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining, by a served user equipment (UE), a downlink signal to noise and interference ratio (SNIR) between the served UE and a serving base station;
   computing, by the served UE, an uplink transmit power level as a function of the downlink SNIR, wherein computing the uplink transmit power level as a function of the downlink SNIR comprises determining the uplink transmit power level in accordance with the following: $P_{tx}=P_f+\max(0, \beta\ SNIR_{DL}-\Delta 2)$, where $P_{tx}$ is the uplink transmit power level, $P_f$ is a full power control (FPC) transmit power level, $\beta$ is a first adjustment factor, $SNIR_{DL}$ is the downlink SNIR, and $\Delta 2$ is a second adjustment factor; and
   transmitting uplink data, from the served UE, over physical uplink shared channel (PUSCH) resources in accordance with the uplink transmit power level.

2. The method of claim 1, wherein the first adjustment factor ($\beta$) is provided to the served UE by the serving base station.

3. The method of claim 1, wherein the second adjustment factor ($\Delta 2$) is provided to the served UE by the serving base station.

4. The method of claim 1, wherein the computing the uplink transmit power level further comprises:

setting the uplink transmit power level to a maximum power level when a product of a first adjustment factor ($\beta$) and the downlink SNIR is less than the second adjustment factor ($\Delta 2$).

5. The method of claim 1, further comprising:
   receiving, by the served UE, control signaling from the serving base station, wherein the control signaling specifies which parameters to use when computing the uplink transmit power level in accordance with the function of the downlink SNIR.

6. The method of claim 5, wherein the control signaling specifies at least one of an alpha parameter and a beta parameter for computing the uplink transmit power level in accordance with the function of the downlink SNIR.

7. A served user equipment (UE) comprising:
   a processor; and
   a computer readable storage medium storing programming for execution by the processor, the programming including instructions to:
   determine a downlink signal to noise and interference ratio (SNIR) between the served UE and a serving base station;
   compute an uplink transmit power level as a function of the downlink SNIR, wherein the instruction to compute the uplink transmit power level as a function of the downlink SNIR includes instructions to determine the uplink transmit power level in accordance with the following: $P_{tx}=P_f+\max(0, \beta\ SNIR_{DL}-\Delta 2)$, where $P_{tx}$ is the uplink transmit power level, $P_f$ is a full power control (FPC) transmit power level, $\beta$ is a first adjustment factor, $SNIR_{DL}$ is the downlink SNIR, and $\Delta 2$ is a second adjustment factor; and
   transmit uplink data over physical uplink shared channel (PUSCH) resources in accordance with the uplink transmit power level.

8. The served UE of claim 7, wherein the first adjustment factor ($\beta$) is provided to the served UE by the serving base station.

9. The served UE of claim 7, wherein the second adjustment factor ($\Delta 2$) is provided to the served UE by the serving base station.

10. The served UE of claim 7, wherein the instructions to compute the uplink transmit power level include instructions to:
    set the uplink transmit power level to a maximum power level when a product of a first adjustment factor ($\beta$) and the downlink SNIR is less than the second adjustment factor ($\Delta 2$).

11. The served UE of claim 7, wherein the programming further includes instructions to:
    receive control signaling from the serving base station, wherein the control signaling specifies which parameters to use when computing the uplink transmit power level in accordance with the function of the downlink SNIR.

12. The served UE of claim 11, wherein the control signaling specifies at least one of an alpha parameter and a beta parameter for computing the uplink transmit power level in accordance with the function of the downlink SNIR.

13. A computer program product comprising a non-transitory computer readable storage medium storing programming, the programming including instructions to:
    determine a downlink signal to noise and interference ratio (SNIR) between a served user equipment (UE) and a serving base station at the served UE;
    compute, at the served UE, an uplink transmit power level as a function of the downlink SNIR, wherein the instruction to compute the uplink transmit power level as a function of the downlink SNIR includes instructions to determine the uplink transmit power level in accordance with the following: $P_{tx}=P_f+\max(0, \beta \, SNIR_{DL}-\Delta 2)$, where $P_{tx}$ is the uplink transmit power level, $P_f$ is a full power control (FPC) transmit power level, $\beta$ is a first adjustment factor, $SNIR_{DL}$ is the downlink SNIR, and $\Delta 2$ is a second adjustment factor; and transmit, from the served UE, uplink data over physical uplink shared channel (PUSCH) resources in accordance with the uplink transmit power level.

14. The computer program product of claim 13, wherein the first adjustment factor ($\beta$) is provided to the served UE by the serving base station.

15. The computer program product of claim 13, wherein the second adjustment factor ($\Delta 2$) is provided to the served UE by the serving base station.

16. The computer program product of claim 13, wherein the programming further includes instructions to:
receive control signaling from the serving base station, wherein the control signaling specifies which parameters to use when computing the uplink transmit power level in accordance with the function of the downlink SNIR.

17. The computer program product of claim 16, wherein the control signaling specifies at least one of an alpha parameter and a beta parameter for computing the uplink transmit power level in accordance with the function of the downlink SNIR.

* * * * *